United States Patent
Lanktree et al.

(10) Patent No.: US 10,823,097 B2
(45) Date of Patent: Nov. 3, 2020

(54) METHOD AND SYSTEM FOR NON-FUNCTIONAL COMBUSTION CHAMBER DETECTION

(71) Applicant: PRATT & WHITNEY CANADA CORP., Longueuil (CA)

(72) Inventors: Michael Lanktree, La Prairie (CA); David Gagnon-Martin, Longueuil (CA); Bruno Villeneuve, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 221 days.

(21) Appl. No.: 15/980,724

(22) Filed: May 15, 2018

(65) Prior Publication Data

US 2019/0353115 A1    Nov. 21, 2019

(51) Int. Cl.
| | | |
|---|---|---|
| *F02D 41/22* | (2006.01) | |
| *F02B 53/02* | (2006.01) | |
| *F02D 41/38* | (2006.01) | |
| *F02D 41/40* | (2006.01) | |
| *F02B 77/08* | (2006.01) | |
| *F02B 53/00* | (2006.01) | |

(52) U.S. Cl.
CPC .............. *F02D 41/22* (2013.01); *F02B 53/02* (2013.01); *F02B 77/085* (2013.01); *F02D 41/3836* (2013.01); *F02D 41/401* (2013.01); *F02B 2053/005* (2013.01); *F02D 2200/101* (2013.01); *F02D 2200/1002* (2013.01)

(58) Field of Classification Search
CPC .. F02B 2053/005; F02B 53/02; F02B 77/085; F02D 41/22; G01M 15/11
See application file for complete search history.

(56) References Cited

U.S. PATENT DOCUMENTS

| | | | | |
|---|---|---|---|---|
| 4,979,481 A | * | 12/1990 | Shimomura | ............ F02D 41/22 123/198 DB |
| 6,892,692 B2 | * | 5/2005 | Barrett | ...................... F01C 1/22 123/205 |
| 7,234,446 B2 | * | 6/2007 | Toyoda | ............... F02D 41/1498 123/406.14 |
| 9,771,860 B2 | | 9/2017 | Thomassin | |
| 2002/0157459 A1 | | 10/2002 | Lehner et al. | |
| 2012/0192630 A1 | | 8/2012 | Westervelt et al. | |

FOREIGN PATENT DOCUMENTS

| | | |
|---|---|---|
| DE | 19540826 A1 | 5/1997 |
| DE | 102016211234 A1 | 12/2017 |
| FR | 2981125A1 A1 | 4/2013 |

* cited by examiner

*Primary Examiner* — Mary Davis
(74) *Attorney, Agent, or Firm* — Norton Rose Fulbright Canada LLP (57) ABSTRACT

Systems and methods for detecting at least one non-functional combustion chamber of an engine comprising a plurality of combustion chambers are described herein. In response to detecting a partial output power loss of the engine, one of the plurality of combustion chambers is assessed by monitoring an engine parameter indicative of an output power of the engine, determining whether a change in the engine parameter has occurred, when the change has occurred, determining that the combustion chamber is functional, and when no change has occurred, determining that the combustion chamber is non-functional and discontinuing fuel injection to the non-functional combustion chamber.

18 Claims, 6 Drawing Sheets

METHOD AND SYSTEM FOR NON-FUNCTIONAL COMBUSTION CHAMBER DETECTION

TECHNICAL FIELD

The present disclosure relates generally to engine power loss diagnostics, and, more particularly, to detecting at least one non-functional combustion chamber of an engine comprising a plurality of combustion chambers.

BACKGROUND OF THE ART

A partial power loss of an engine may occur due to component failure. For example, a rotary engine may use apex seals and when an apex seal fails, a power loss of the rotary engine occurs. In particular, apex seals are used in a rotary engine to seal and separate combustion chambers, and as such when an apex seal fails, combustion chambers of the rotary engine become non-functional. Fuel would typically still be injected into non-functional combustion chambers, which leads to wasting fuel in addition to the power loss.

There is therefore a need for methods and systems for detecting one or more non-functional combustion chamber of an engine comprising a plurality of combustion chambers.

SUMMARY

In one aspect, there is provided a method for detecting at least one non-functional combustion chamber of an engine comprising a plurality of combustion chambers, each combustion chamber for receiving a fuel-air mixture that when ignited causes the engine to generate output power. The method comprises, in response to detecting a partial output power loss of the engine, assessing one of the plurality of combustion chambers by reducing fuel injection to the combustion chamber, monitoring an engine parameter indicative of the output power of the engine, determining whether a decrease in the engine parameter has occurred when fuel injection is reduced to the combustion chamber, if the decrease in the engine parameter has occurred, restoring fuel injection to the combustion chamber and assessing another one of the plurality of combustion chambers, and if no decrease in the engine parameter has occurred, determining that the combustion chamber is non-functional and discontinuing fuel injection to the combustion chamber.

In another aspect, there is provided a system for detecting at least one non-functional combustion chamber of an engine comprising a plurality of combustion chambers, each combustion chamber for receiving a fuel-air mixture that when ignited causes the engine to generate output power. The system comprises at least one processing unit and a non-transitory computer-readable memory having stored thereon program instructions executable by the at least one processing unit for, in response to detecting a partial output power loss of the engine, assessing one of the plurality of combustion chambers by reducing fuel injection to the combustion chamber, monitoring an engine parameter indicative of the output power of the engine, determining whether a decrease in the engine parameter has occurred when fuel injection is reduced to the combustion chamber, if the decrease in the engine parameter has occurred, restoring fuel injection to the combustion chamber and assessing another one of the plurality of combustion chambers, and if no decrease in the engine parameter has occurred, determining that the combustion chamber is non-functional and discontinuing fuel injection to the combustion chamber.

In yet another aspect, there is provided a method for detecting at least one non-functional combustion chamber of an engine comprising a plurality of combustion chambers, each combustion chamber for receiving a fuel-air mixture that when ignited causes the engine to generate output power. The method comprises, in response to detecting a partial output power loss of the engine, assessing one of the plurality of combustion chambers by monitoring an engine parameter indicative of the output power of the combustion chamber, determining whether a change in the engine parameter has occurred, and, if no change in the engine parameter has occurred, determining that the combustion chamber is non-functional and discontinuing fuel injection to the combustion chamber.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
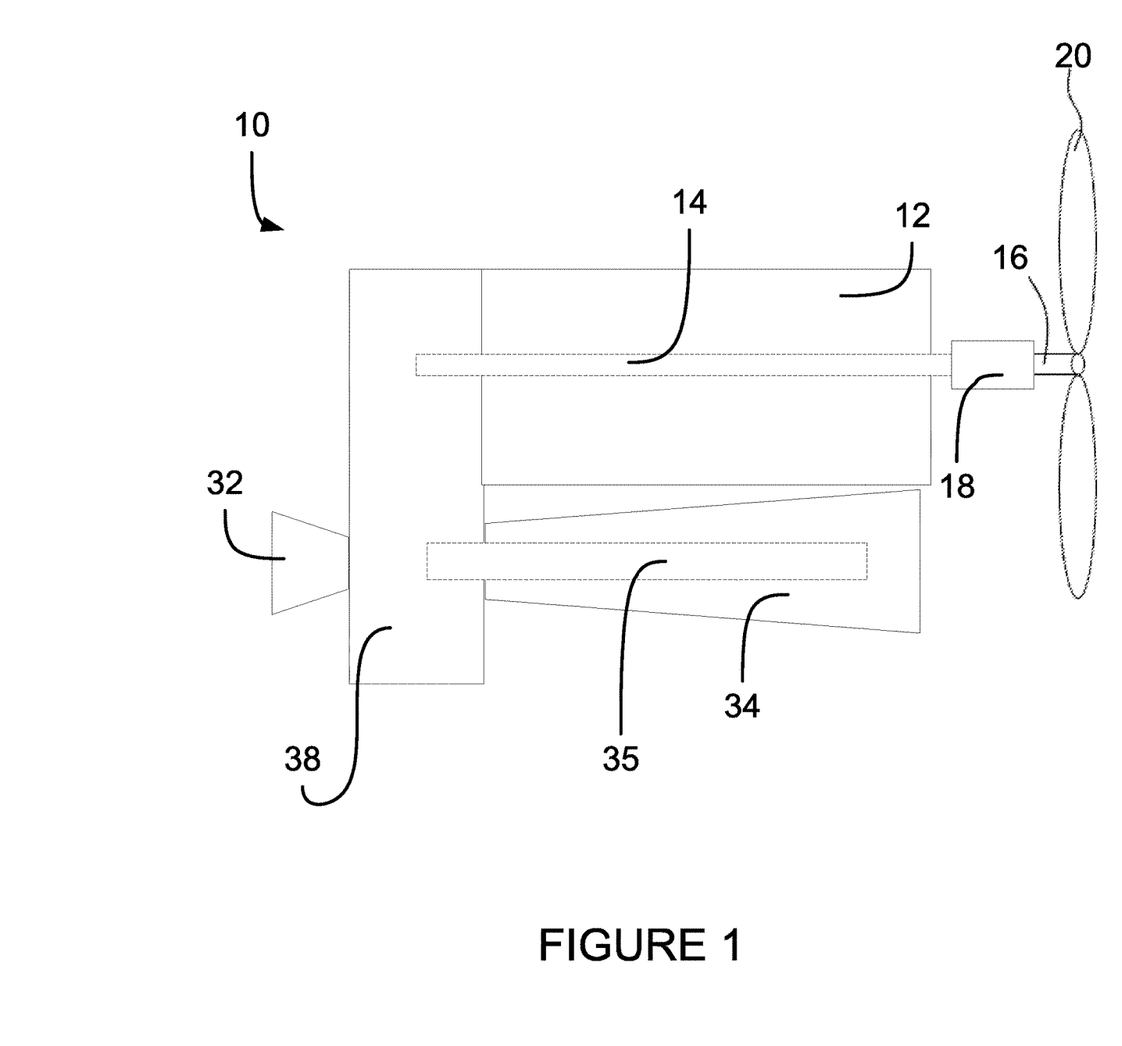
FIG. 1 is a schematic example of an engine assembly in accordance with an embodiment.

Referring to FIG. 1, an engine assembly 10 is generally shown and includes an internal combustion engine 12. In a particular embodiment, the engine assembly 10 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly may be used as a prime mover engine, such as on an aircraft or other vehicle, or in any other suitable application.

In accordance with an embodiment, the engine 12 is an intermittent internal combustion engine comprising one or more rotor assemblies, for example three (3) rotor assemblies, each configured for example as a Wankel engine. It is understood that the internal combustion engine 12 may have any other suitable configuration, for example including one or more reciprocating pistons.

In the illustrated embodiment, the engine 12 drives an engine shaft 14 that is drivingly engaged to a propeller shaft 16 via a reduction gearbox 18 so as to drive an aircraft propeller 20. It is however understood that the engine assembly 10 may alternately or additionally be configured to drive any other appropriate type of load, including, but not limited to, one or more generator(s), accessory(ies), rotor mast(s), compressor(s), or any other appropriate type of load or combination thereof.

In the embodiment shown, the engine assembly 10 comprises a compressor 32 for compressing the air before it is fed to the intake of the engine 12, and a turbine section 34 receiving the exhaust gases from the engine 12. In the illustrated embodiment, the engine 12, the compressor 32, and the turbine section 34 are in driving engagement with a gearbox 38. The gearbox 38 may be configured to allow the turbine section 34 via a turbine shaft 35 to compound power with the engine shaft 14 and to allow the turbine section 34 and/or the engine 12 to drive the compressor 32. It is understood that variations are possible, and that, for example, the compressor 32, turbine section 34 and/or the gearbox 38 may be omitted.

Figure 2:
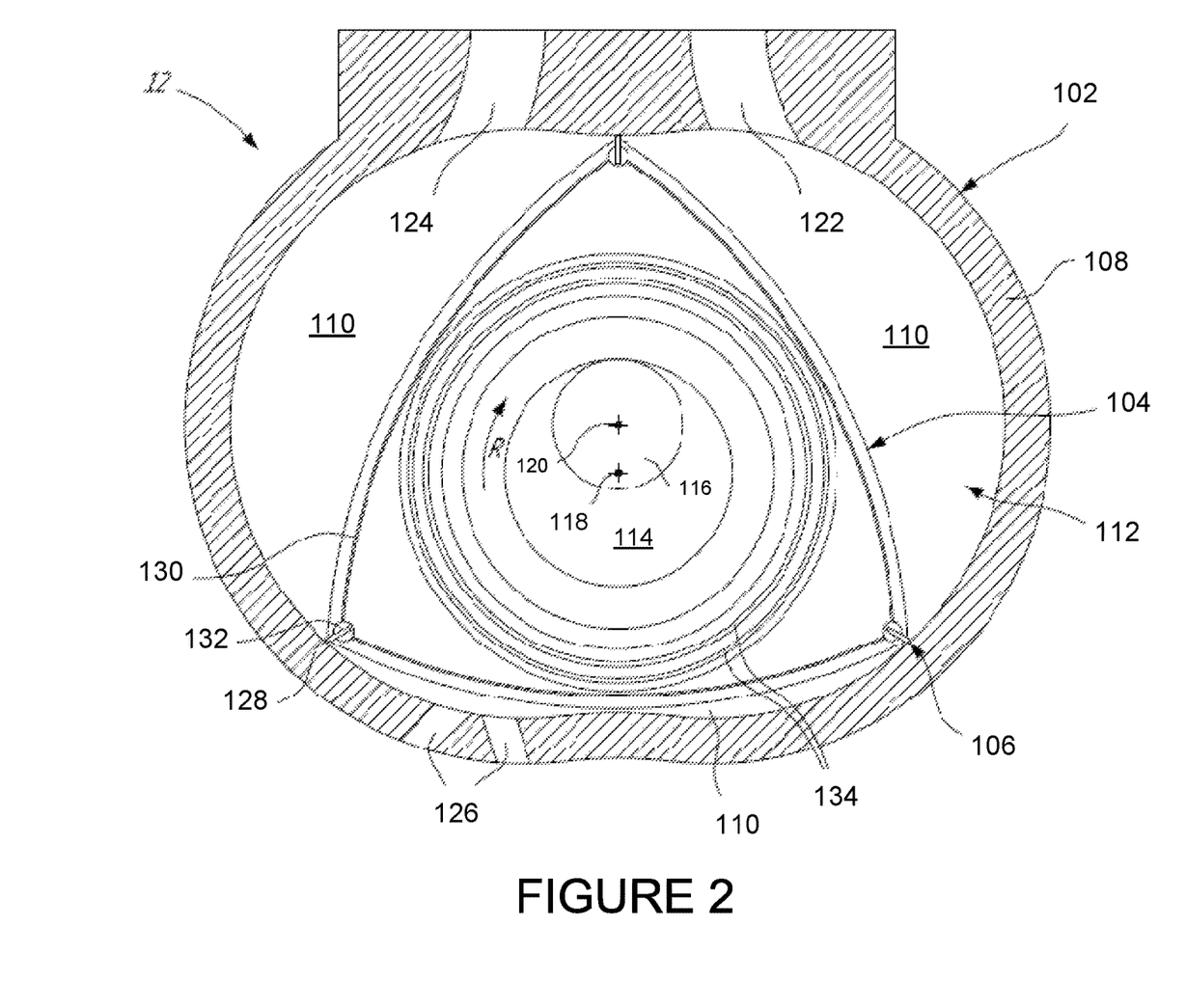
FIG. 2 is a schematic cross-sectional view of a rotary engine which may be used in the engine assembly of FIG. 1.

Referring to FIG. 2, an example of a rotary engine which may be used for the engine 12 is shown. It is understood that the configuration of the engine 12, e.g. placement of ports, number and placement of seals, etc., may vary from that of the embodiment shown. The engine 12 comprises a housing 102 defining a rotor cavity having a profile defining two lobes, which may be an epitrochoid. A rotor 104 is received within the rotor cavity. The rotor 104 defines three circumferentially-spaced apex portions 106, and a generally triangular profile with outwardly arched sides. The apex portions 106 are in sealing engagement with the inner surface of a peripheral wall 108 of the housing 102 to form and separate three working chambers 110 of variable volume between the rotor 104 and the housing 102. The chambers 110 may be referred to herein as "combustion chambers". The peripheral wall 108 extends between two axially spaced apart end walls 112 to enclose the rotor cavity.

The rotor 104 is engaged to an eccentric portion 114 of an output shaft 116 to perform orbital revolutions within the rotor cavity. The output shaft 116 performs three rotations for each orbital revolution of the rotor 104. The geometrical axis 118 of the rotor 104 is offset from and parallel to the axis 120 of the housing 102. During each orbital revolution, each chamber 110 varies in volume and moves around the rotor cavity to undergo the four phases of intake, compression, expansion and exhaust.

An intake port 122 is provided through the peripheral wall 108 for admitting compressed air into one of the working chambers 110. An exhaust port 124 is also provided through the peripheral wall 108 for discharge of the exhaust gases from the working chambers 110. Passages 126 for a spark plug, glow plug or other ignition mechanism, as well as for one or more fuel injectors of a fuel injection system (not shown) are also provided through the peripheral wall 108. Alternately, the intake port 122, the exhaust port 124 and/or the passages 126 may be provided through the end or side wall 112 of the housing. A subchamber (not shown) may be provided in communication with the chambers 110, for pilot or pre injection of fuel for combustion.

For efficient operation, the working chambers 110 are sealed by spring-loaded peripheral or apex seals 128 extending from the rotor 104 to engage the inner surface of the peripheral wall 108, and spring-loaded face or gas seals 130 and end or corner seals 132 extending from the rotor 104 to engage the inner surface of the end walls 112. The rotor 104 also includes at least one spring-loaded oil seal ring 134 biased against the inner surface of the end wall 112 around the bearing for the rotor 104 on the shaft eccentric portion 114.

The fuel injector(s) of the engine 12, which in an embodiment are common rail fuel injectors, communicate with a source of fuel (e.g. heavy fuel, diesel, kerosene (jet fuel), equivalent biofuel and/or any other suitable type of fuel), and deliver the fuel into the engine 12 such that the combustion chamber is stratified with a rich fuel-air mixture near the ignition source and a leaner mixture elsewhere.

Figure 3A:
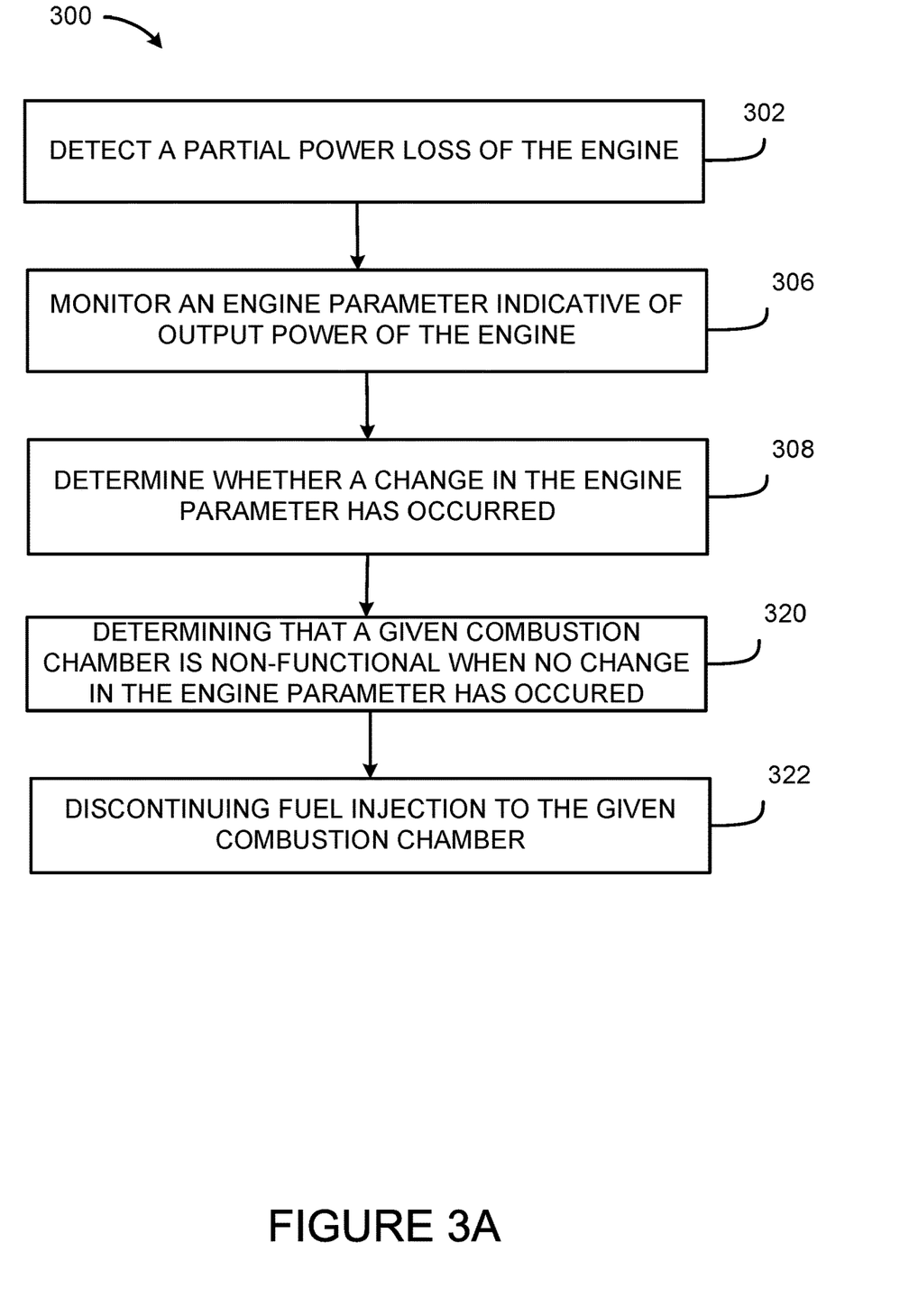
FIG. 3A is a flowchart illustrating an example method for detecting at least one non-functional combustion chamber of an engine comprising a plurality of combustion chambers in accordance with an embodiment.

With reference to FIG. 3A, there is shown a flowchart illustrating an example method 300 for detecting at least one non-functional combustion chamber of an engine comprising a plurality of combustion chambers, where each combustion chamber is configured for receiving a fuel-air mixture that when ignited causes the engine to generate output power, such as engine 12 of FIG. 2. While the method 300 is described herein with reference to the engine 12 of FIG. 2, this is for example purposes. The method 300 may be applied to any suitable engine comprising a plurality of combustion chambers.

At step 302, a partial output power loss of the engine 12 is detected. The detection of the partial output power loss may vary depending on practical implementations. The output power of the engine 12 may be monitored to detect the partial output power loss. Monitoring of the output power of the engine 12 may be performed in real time and/or may be performed in accordance with any suitable time interval. One or more measuring devices comprising one or more sensors for measuring the rotational speed of the output shaft 116 of the engine 12 and/or one or more sensors for measuring the output torque of the engine 12 may be used. For example, a shaft rotational speed sensor and/or a torque sensor may be used. Torque may be measured with a strain gauge, by use of magnetic and/or inductive technology to measure a twist in the shaft 116, by measuring a pressure sensed on a face of a helical gear or by any other suitable mechanism. The measurements obtained from the measuring device may be used to determine the power of the engine 12. For example, the output power of the engine 12 may be determined from the rotational speed and torque measurements. Alternatively, the output power of the engine 12, the rotational speed of the output shaft 116 and/or the output torque of the engine 12 may be provided by an engine computer or an aircraft computer. In some embodiments, time-derivatives of measurements from torque and/or rotational speed sensors could be used to determine the partial output power loss of the engine 12. A torque demand could be used to confirm that the partial loss of power was an unintentional occurrence. For example, an electrical signal may be provided by an aircraft computer or a power lever angle indicative of the torque demand. If the torque demand is substantially constant when the partial output power loss has occurred, this could indicate that the partial output power loss was unintentional and thus method 300 may continue to step 302. The partial output power loss may be determined from monitoring any engine parameter indicative of the output power of the engine 12. For example, the output torque of the engine 12 may be monitored at step 302, and a partial loss of the output torque of the engine 12 could be used to detect the partial output power loss. By way of another example, the rotational speed of the output shaft 116 may be monitored at step 302, and a loss of the rotational speed of the shaft 116 could be used to detect the partial output power loss. Monitoring of other engine parameters indicative of the output power of the engine 12 is contemplated.

At step 306, an engine parameter indicative of the output power of the engine 12 is monitored. The engine parameter may be the output power of the engine 12, the output torque of the engine 12, a rotational speed of the output shaft 116 of the engine 12, metal temperature of the engine 12, exhaust gas temperature of the engine 12, combustion chamber pressure, vibration of the engine 12, one or more time-derivatives of the aforementioned or any other suitable parameter of the engine 12. In some embodiments, the engine parameter may be a combination of one or more of the aforementioned parameters. In some embodiments, the engine parameter is indicative of the output power of a given combustion chamber (e.g., the output power of the given combustion chamber, the metal temperature of the given combustion chamber, etc.). Monitoring of the engine parameter may be performed in real time and/or may be performed in accordance with any suitable time interval. One or more of the measuring devices discussed above may be used to monitor the engine parameter. Accordingly, one or more temperature sensors, pressure sensors, magnetic and/or inductive sensors, strain gauges, vibrations sensors, or any other suitable sensor may be used. Alternatively, the engine parameter may be provided by an engine computer or an aircraft computer.

At step 308, the method 300 determines whether a change in the engine parameter has occurred. The change in the engine parameter may be an increase or a decrease in the engine parameter depending on the engine parameter being used. Accordingly, step 308 may comprise determining whether a decrease (or an increase) in engine parameter has occurred. For example, when the engine parameter is power, the method 300 determines at step 308 whether a decrease in power has occurred. When the engine parameter is torque, the method 300 determines at step 308 whether a decrease in torque has occurred. When the engine parameter is rotational speed of the output shaft 116, the method determines at step 308 whether a decrease in rotational speed has occurred. When the engine parameter is metal temperature of the engine 12, the method determines at step 308 whether a decrease in metal temperature has occurred. When the engine parameter is vibration of the engine 12, the method may determine at step 308 whether an increase in vibration has occurred.

At step 320, the method 300 determines that the given combustion chamber is non-functional when no change (i.e. increase or decrease, as discussed above) in the engine parameter has occurred. It should be appreciated that if the given combustion chamber is not igniting the fuel-air mixture then the given combustion chamber is not contributing to the output power of the engine 12. Thus, from no change in the engine parameter it can be determined that no change in the output power of the engine 12 and/or the given combustion chamber has occurred. Accordingly, no change in the engine parameter indicative of the output power of the given combustion chamber may be used to determine that the given combustion chamber is non-functional. In some embodiments, at step 322, when the given combustion chamber is detected as non-functional, a fuel injection to the non-functional combustion chamber is discontinued by turning off the fuel injection to the non-functional combustion chamber.

The method 300 may assess (e.g., sequentially) each one of the plurality of combustion chambers 110, in response to detecting the partial output power loss at step 302. In particular, the method 300 may perform steps 306, 308, 320 and 322 for each one of the combustion chambers 110. This may be referred to as a "diagnostic check" for determining the cause of the partial output power loss. Accordingly, the method 300 may proceed back to step 306 after step 320 and/or 322, to repeat the method 300 for a different one of the combustion chambers 110 until each combustion chamber is assessed. Accordingly, the method 300 may determine which ones of the combustion chambers 110 are non-functional and/or the number of non-functional combustion chambers based on the combustion chamber(s) determined as non-functional at step 320.

Figure 3B:
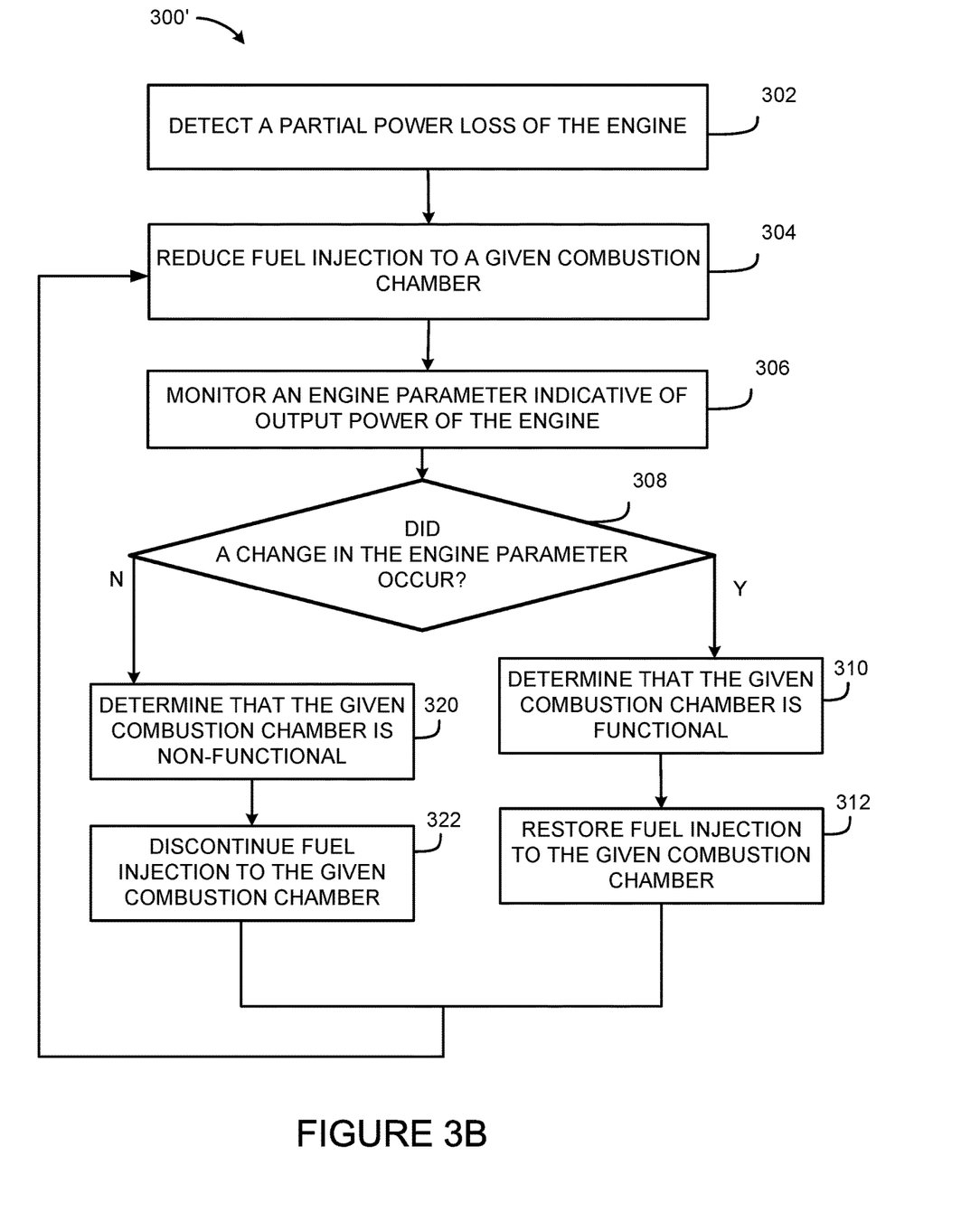
FIG. 3B is a flowchart illustrating a variant of the method of FIG. 3A.

With reference to FIG. 3B, there is shown a flowchart illustrating an example method 300' for detecting at least one non-functional combustion chamber of an engine. The method 300' is a variant of the method 300. Alike reference numbers indicate corresponding steps between the methods 300 and 300'. While the method 300' is described herein with reference to the engine 12 of FIG. 2, this is for example purposes. The method 300' may be applied to any suitable direct injection engine comprising a plurality of combustion chambers, where each combustion chamber is configured for receiving a fuel-air mixture that when ignited causes the engine to generate output power. The method 300' may also be applied to any suitable multiport injection piston engine.

In response to detecting the partial output power loss at step 302, the method 300' proceeds to assess at least one of the combustion chambers 110. At step 304, fuel injection is reduced to a given one of the combustion chambers 110. Reducing fuel injection to the at least one combustion chamber may comprise shutting off fuel injection to the at least one combustion chamber (i.e. decreasing an amount of fuel injected to the combustion chamber to substantially zero) or may comprise partially reducing an amount of fuel of the fuel injection to the at least one combustion chamber (i.e. decreasing the amount of fuel injected to the combustion chamber to a non-zero value). For example, a control signal may be sent to the fuel injection system, which in turn causes the one or more fuel injectors of the engine 12 to shut off fuel injection to the given combustion chamber. Accordingly, in this example, when the given combustion chamber would typically receive a fuel injection (e.g., at the end of the compression phase), the fuel injection to the given combustion chamber is omitted. The other combustion chambers would still receive fuel injection. By way of another example, a control signal may be sent to the fuel injection system, which in turn causes the one or more fuel injectors of the engine 12 to partially reduce the amount of fuel of the fuel injection to the given combustion chamber. Accordingly, in this example, when the given combustion chamber would typically receive an injection of fuel having a given amount (e.g., at the end of the compression phase), a portion of the given amount of the fuel is provided to the given combustion chamber. The other combustion chambers would still receive fuel injection.

At step 306, the engine parameter indicative of output power of the engine is monitored, as described elsewhere in this document. At step 308, the method 300' determines whether a change in the engine parameter has occurred as described elsewhere in this document. For method 300', step 308 is performed when the fuel injection to the given combustion chamber is reduced. Accordingly, the engine parameter before reducing the fuel injection can be compared to the engine parameter after reducing the fuel injection to determine whether a change in the engine parameter has occurred.

At step 310, the given combustion chamber is determined as being functional if a change (e.g., a decrease) in the engine parameter has occurred. In this case, a change (e.g., a decrease) in the engine parameter is indicative that the output power of the engine 12 has changed (e.g., decreased). Thus, it can be determined that the output power of the engine 12 has changed (e.g., decreased). At step 312, when the given combustion chamber is determined as being functional, fuel injection is restored to the given combustion chamber by turning the fuel injection back on to the given combustion chamber. Another one of the plurality of combustion chambers may then be assessed.

At step 320, the given combustion chamber is determined as being non-functional if no change (e.g., no decrease) in the engine parameter has occurred. In this case, no change (e.g., no decrease) in the engine parameter is indicative that the output power of the engine 12 has not changed (e.g., not decreased). Thus, it can be determined that the output power of the engine 12 has not changed (e.g., not decreased). At step 322, when the given combustion chamber is determined as being non-functional, the fuel injection to the given combustion chamber is discontinued. For example, when the fuel injection to the at least one combustion chamber is shut off at step 304, then step 322 comprises maintaining the shutting off of the fuel injection to the at least one combustion chamber. By way of another example, when the amount of fuel of the fuel injection to the at least one combustion chamber is partially reduced at step 304, then step 322 comprises shutting off of the fuel injection to the at least one combustion chamber.

In response to detecting the partial output power loss at step 302, the method 300' may assess (e.g., sequentially) each one of the plurality of combustion chambers 110 to perform the diagnostic check by performing steps 304, 306, 308, 320 and 322 or 310 and 312 for each one of the combustion chambers 110. Accordingly, the method 300' may proceed back to step 304 after step 312 or step 322, to repeat the method 300' for a different one of the combustion chambers 110 until each combustion chamber is assessed. Accordingly, the method 300' may determine which ones of the combustion chambers 110 are non-functional and/or the number of non-functional combustion chambers based on the combustion chamber(s) determined as non-functional at step 320. It should be appreciated that it is desirable for the method 300' to be performed for a minimal duration (i.e. to occur rapidly) in order to avoid significant and unnecessary power loss that may result from discounting fuel to functioning combustion chambers while other chamber(s) are non-functioning.

In some embodiments, at step 302, an estimated number of non-functional combustion chambers may be determined based on the partial output power loss. The estimated number of non-functional combustion chambers may be determined as a function of the detected amount of partial output power loss and the total number of combustion chambers 110. For example, when the engine 12 has three (3) combustion chambers 110 and if the partial output power loss is approximately a one-third (⅓) power loss, then the number of non-functional combustion chambers is estimated as one (1). By way of another example, when the engine 12 has three (3) combustion chambers 110 and if the partial output power loss is approximately a two-third (⅔) power loss, then the number of non-functional combustion chambers is estimated as two (2).

In some embodiments, at step 308, a decrease in the engine parameter may be detected when the engine parameter decreases by an expected amount compared to the engine parameter prior to fuel injection to the given combustion chamber being reduced. The expected amount of engine parameter decrease may be determined as a function of the partial output power loss (or the number of estimated non-functional combustion chambers), the number of combustion chambers 110 and/or the engine parameter prior to reducing the fuel injection to the given combustion chamber.

For example, when the engine 12 has three (3) combustion chambers 110 and the number of non-functional combustion chambers is estimated as one (1) at step 302, a decrease in the engine parameter (e.g., output power) of approximately one-half (½) is expected when fuel injection to a functional combustion chamber is shut off. Accordingly, in this example, the expected amount is approximately one-half (½) of the engine parameter prior to shutting off the fuel injection to the given combustion chamber. In some embodiments, the expected amount of engine parameter decrease may be determined from an estimate of the power being generated by each combustion chamber 110. For example, the estimate of the power being generated by each combustion chamber 110 may be determined based on power demand, throttle position and/or torque demand. Accordingly, the expected amount of engine parameter decrease may be the estimated power per combustion chamber 110. In the case where a combustion chamber is configured to deliver a different torque and/or power relative to at least one other combustion chamber, the expected amount of engine parameter decrease could be known.

In some embodiments, at step 302, detecting the partial output power loss of the engine 12 comprises monitoring the engine parameter and detecting that the engine parameter is below a first threshold. The first threshold may be set to a percentage (e.g., 90%) of the engine parameter prior to a change in the engine parameter. The torque demand can be assessed to determine that the torque demand is substantially constant when the change in engine parameter occurs. The first threshold may be any suitable value and may vary depending on practical implementations.

In some embodiments, at step 308, determining whether a change in the engine parameter has occurred comprises monitoring the engine parameter to detect the engine parameter is below a second threshold. The second threshold may be set to a percentage (e.g., 75%) of the engine parameter prior to reducing the fuel injection to the given combustion chamber. The second threshold may be set as a function of the number of combustion chambers and/or the amount of the partial output power loss determined at step 302. The second threshold may be any suitable value and may vary depending on practical implementations.

In some embodiments, step 308, comprises determining a difference between a value of the engine parameter before reducing the fuel injection and a value of the engine parameter after reducing the fuel injection; determining that the change (e.g., the decrease) has occurred, when the difference exceeds a third threshold; and that no change (e.g. no decrease) has occurred if the difference does not exceed the third threshold. The third threshold may be set based on the engine parameter prior to reducing the fuel injection to the given combustion chamber. The third threshold may be set as a function of the number of combustion chambers and/or the amount of the partial output power loss determined at step 302. The third threshold may be any suitable value and may vary depending on practical implementations. Accordingly, at step 310, the given combustion chamber may be determined as being functional, if a change (e.g., a decrease) in the engine parameter is outside of an acceptable amount of variation of the engine parameter. Similarly, at step 320, the given combustion chamber may be determined as being non-functional, if there is a change (e.g., a decrease) in the engine parameter within an acceptable amount of variation of the engine parameter.

In some embodiments, when the engine 12 is a rotary engine comprising a plurality of rotors with each having an apex seal for sealing the plurality of combustion chambers, the method 300' may further comprise detecting failure of an apex seal and/or determining which apex seal has failed.

The method 300, 300' may detect failure of an apex seal of a rotary engine based on the partial output power loss at step 302 and the number of combustion chambers 110. For example, when the engine 12 has three (3) combustion chambers 110 and if the partial output power loss is approximately a two-third (⅔) power loss, then the method 300' may detect failure of an apex seal, as the apex seal is used to seal two (2) separate combustion chambers from each other.

The method 300, 300' may detect failure of an apex seal based on the number of non-functional combustion chambers estimated at step 302 or determined from step 320. For example, when the engine 12 has three (3) combustion chambers 110 and if two (2) combustion chambers are non-functional, this may indicate that an apex seal has failed.

The method 300, 300' may determine which apex seal has failed based on the non-functional combustion chambers determined at step 320. A given combustion chamber under assessment may be defined as a chamber between two (2) apex seals 128. Accordingly, the determination of a non-functional combustion chamber at step 320 may indicate a failure of one (1) of the two (2) apex seals 128 of that combustion chamber. When two (2) adjacent combustion chambers are determined as non-functional at step 320, this may indicate failure of the apex seal between the two (2) adjacent combustion chambers.

In some embodiments, the method 300, 300' further comprises adjusting one or more engine control parameters, including, but not limited to, a timing of fuel injection and rail pressure. For example, the method 300, 300' further comprises adjusting a timing of fuel injection to the engine 12 in response to detecting at least one of the combustion chambers is non-functional. By way of another example, the method 300, 300' further comprises adjusting rail pressure of the engine 12 in response to detecting at least one of the combustion chambers is non-functional. In some embodiments, the method 300, 300' determines if it is deemed safe to modify the timing of fuel injection and/or rail pressure. It should be appreciated that the loss in power may not be permanent and may be at least in part regained by adjusting one or more engine control parameters. For example, in the event that a flameout occurs due to delayed combustion, and not necessarily hardware damage, injection timing could be advanced and/or rail pressure could be increased to try to regain control of the combustion process in a given combustion chamber. This is an example with electronic control of the injectors and of the fuel rail pressure.

In some embodiments, the method 300, 300' may determine a failure of at least one engine component, such as one or more of a broken sub-chamber, a broken glow plug, a fouled fuel injector, a cracked rotor, a rotor flameout, a cracked piston head, a faulty injector and a fouled spark plug. For instance, each failure of an engine component may have a signature that can be determined from one or more engine parameters, such as metal temperature, exhaust gas temperature, speed, torque, their time-derivatives and/or any other suitable engine parameter. The engine parameter(s) can be measured, a signature can be generated from the engine parameter(s), the generated signature can be compared to a signature stored in a database, and a failure of an engine component can be determined when the generated signature corresponds to the stored signature indicative of failure of the engine component.

It should be appreciated that by shutting off fuel to the non-functional combustion chamber(s) according to the method 300, 300', power and/or fuel efficiency may be maximized in response to a hardware and/or component failure of the engine 12.

While the method 300, 300' is described herein with reference to a rotary engine, the method 300 may be applied to other types of engines. In some embodiments, the engine 12 may be an auxiliary power unit (APU). In some embodiments, the engine 12 is a direct injection engine.

Figure 4:
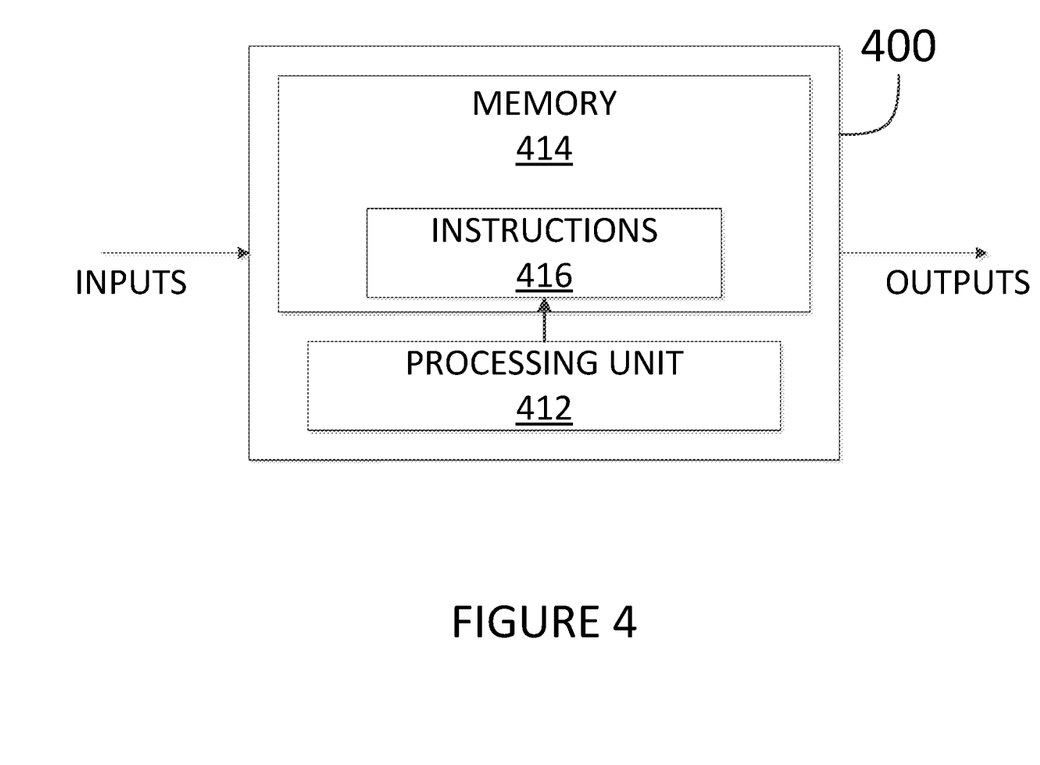
FIG. 4 is a block diagram of an example computing system for implementing the methods of FIGS. 3A and 3B in accordance with an embodiment.

With reference to FIG. 4, the method 300, 300' may be implemented using a computing device 400 comprising a processing unit 412 and a memory 414 which has stored therein computer-executable instructions 416. The processing unit 412 may comprise any suitable devices configured to implement the system such that instructions 416, when executed by the computing device 400 or other programmable apparatus, may cause the functions/acts/steps of the method 300, 300' as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including electronic engine control (EEC), engine control unit (ECU), and the like.

The methods and systems for detection of at least one non-functional combustion chamber described herein may be implemented in a high level procedural or object oriented programming or scripting language, or a combination thereof, to communicate with or assist in the operation of a computer system, for example the computing device 400. Alternatively, the methods and systems for detection of at least one non-functional combustion chamber may be implemented in assembly or machine language. The language may be a compiled or interpreted language. Program code for implementing the methods and systems for detection of at least one non-functional combustion chamber may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detection of at least one non-functional combustion chamber may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 5:
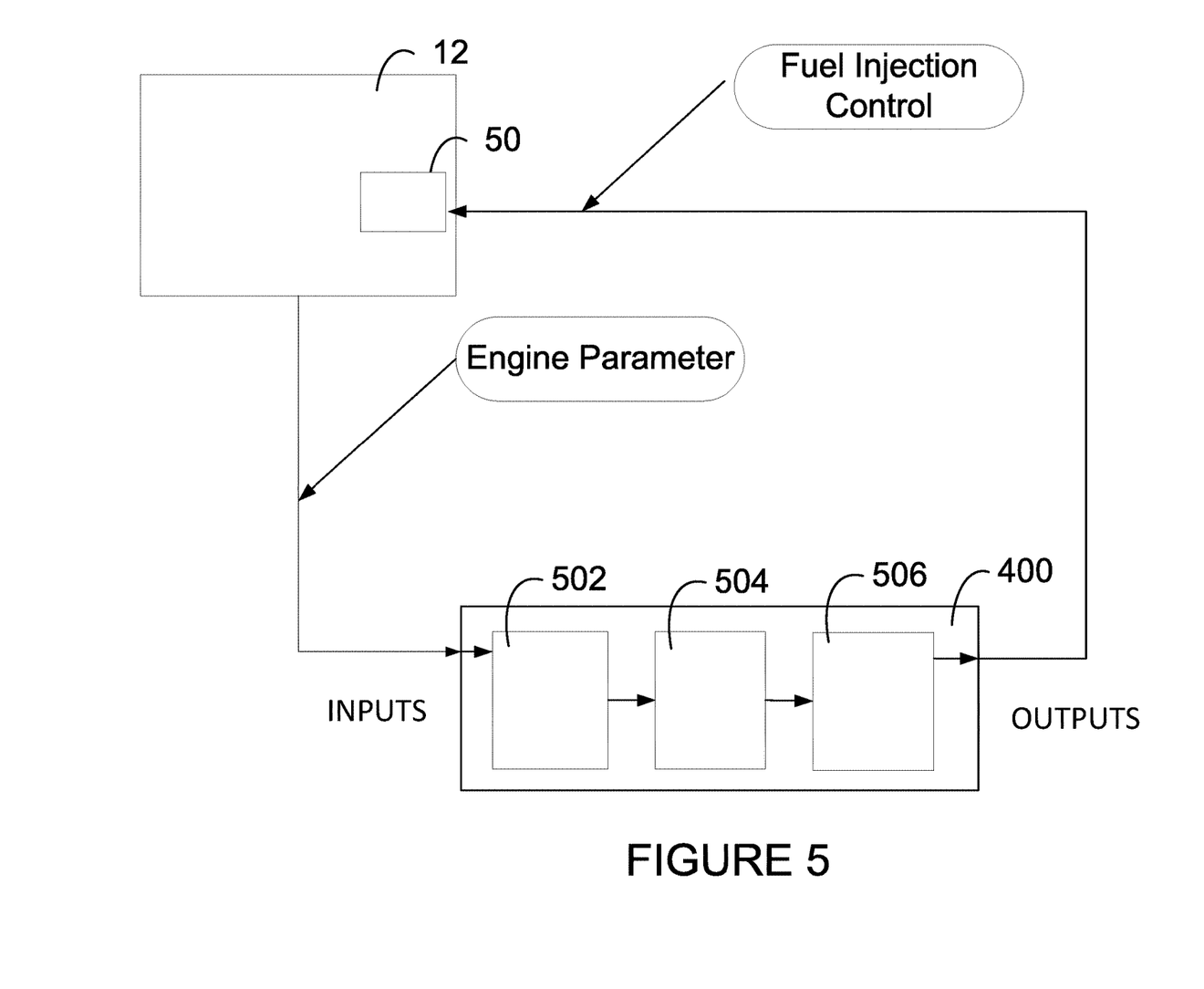
FIG. 5 is a block diagram of a system for non-functional combustion chamber detection in accordance with an embodiment.

With reference to FIG. 5, a block diagram illustrates a system for non-functional combustion chamber detection in accordance with an embodiment. In this example embodiment, engine parameter (e.g., output power or torque of the engine 12) is obtained from engine 12, as described elsewhere in this document. The computing device 400 implements the method 300'. An engine parameter monitoring module 502 determines the partial output power loss of the engine 12 according to step 302 of method 300'. In this example, the engine parameter monitoring module 502 is also used to monitor the engine parameter at step 306 and to determine if a decrease in engine parameter occurs at step 308. A non-functional chamber detection module 504 detects whether a given combustion chamber is functional or non-functional according to steps 310 and 320 of method 300'. A fuel injection control module 506 controls the fuel injection to the combustion chambers according to steps 304, 322 and 312 of the method 300'. In this example, the fuel injection control module sends signals to the fuel injection system 50. The fuel injection system 50 controls fuel injection to the engine 12, as described elsewhere in this document. The configuration of the modules 502, 504, 506 may vary depending on practical implementations.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detection of at least one non-functional combustion chamber may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for operating a rotary engine including detecting at least one non-functional combustion chamber of the rotary engine comprising a plurality of combustion chambers and having an apex seal for sealing the plurality of combustion chambers, each combustion chamber for receiving a fuel-air mixture that when ignited causes the rotary engine to generate output power, the method comprising:
   in response to detecting a partial output power loss of the rotary engine, assessing one of the plurality of combustion chambers by:
   reducing fuel injection to the combustion chamber;
   monitoring an engine parameter indicative of the output power of the rotary engine;
   determining whether a decrease in the engine parameter has occurred when fuel injection is reduced to the combustion chamber;
   if the decrease in the engine parameter has occurred, restoring fuel injection to the combustion chamber and assessing another one of the plurality of combustion chambers;
   if no decrease in the engine parameter has occurred, determining that the combustion chamber is non-functional and discontinuing fuel injection to the combustion chamber; and
   detecting failure of the apex seal when two adjacent combustion chambers are determined as non-functional.

2. The method of claim 1, wherein reducing fuel injection to the combustion chamber comprises decreasing an amount of fuel injected into the combustion chamber to substantially zero, thereby shutting off fuel injection to the combustion chamber.

3. The method of claim 2, wherein discontinuing fuel injection to the combustion chamber comprises maintaining the shut-off of the fuel injection to the combustion chamber.

4. The method of claim 1, further comprising assessing another one of the plurality of combustion chambers subsequent to discontinuing fuel injection to the combustion chamber.

5. The method of claim 4, wherein the method is repeated until all combustion chambers have been assessed.

6. The method of claim 1, wherein monitoring the engine parameter comprises monitoring the output power of the rotary engine.

7. The method of claim 1, wherein monitoring the engine parameter comprises monitoring at least one of an output torque of the rotary engine and a rotational speed of an output shaft of the rotary engine.

8. The method of claim 1, further comprising adjusting at least one of a timing of fuel injection to the engine and a rail pressure of the engine, in response to detecting that the combustion chamber is non-functional.

9. A system for operating a rotary engine including detecting at least one non-functional combustion chamber of the rotary engine comprising a plurality of combustion chambers and having an apex seal for sealing the plurality of combustion chambers, each combustion chamber for receiving a fuel-air mixture that when ignited causes the rotary engine to generate output power, the system comprising:
   at least one processing unit; and
   a non-transitory computer-readable memory having stored thereon program instructions executable by the at least one processing unit for:
   in response to detecting a partial output power loss of the rotary engine, assessing one of the plurality of combustion chambers by:
   reducing fuel injection to the combustion chamber;
   monitoring an engine parameter indicative of the output power of the rotary engine;

determining whether a decrease in the engine parameter has occurred when fuel injection is reduced to the combustion chamber;

if the decrease in the engine parameter has occurred, restoring fuel injection to the combustion chamber and assessing another one of the plurality of combustion chambers;

if no decrease in the engine parameter has occurred, determining that the combustion chamber is non-functional and discontinuing fuel injection to the combustion chamber; and detecting failure of the apex seal when two adjacent combustion chambers are determined as non-functional.

10. The system of claim 9, wherein the program instructions are executable by the at least one processing unit for reducing fuel injection to the at least one combustion chamber comprising decreasing an amount of fuel injected into the at least one combustion chamber to substantially zero, thereby shutting off fuel injection to the at least one combustion chamber.

11. The system of claim 10, wherein the program instructions are executable by the at least one processing unit for discontinuing fuel injection to the at least one combustion chamber comprising maintaining the shut-off of the fuel injection to the at least one combustion chamber.

12. The system of claim 9, wherein the program instructions are further executable by the at least one processing unit for assessing another one of the plurality of combustion chambers subsequent to discontinuing fuel injection to the combustion chamber.

13. The system of claim 12, wherein the program instructions are further executable by the at least one processing unit for repeating the assessing until all combustion chambers have been evaluated.

14. The system of claim 9, wherein the program instructions are executable by the at least one processing unit for monitoring the output power of the rotary engine.

15. The system of claim 9, wherein the program instructions are executable by the at least one processing unit for monitoring at least one of an output torque of the rotary engine and a rotational speed of an output shaft of the rotary engine.

16. The system of claim 9, wherein the program instructions are further executable by the at least one processing unit for adjusting at least one of a timing of fuel injection to the rotary engine and a rail pressure of the rotary engine, in response to detecting that the combustion chamber is non-functional.

17. A method for operating a rotary engine including detecting at least one non-functional combustion chamber of the rotary engine comprising a plurality of combustion chambers and having an apex seal for sealing the plurality of combustion chambers, each combustion chamber for receiving a fuel-air mixture that when ignited causes the rotary engine to generate output power, the method comprising:

in response to detecting a partial output power loss of the engine, assessing one of the plurality of combustion chambers by:

monitoring an engine parameter indicative of the output power of the combustion chamber;

determining whether a change in the engine parameter has occurred;

if no change in the engine parameter has occurred, determining that the combustion chamber is non-functional and discontinuing fuel injection to the combustion chamber; and detecting failure of the apex seal when two adjacent combustion chambers are determined as non-functional.

18. The method of claim 17, wherein the engine parameter is a metal temperature of the combustion chamber.

* * * * *